United States Patent [19]

Lehr et al.

[11] Patent Number: 4,820,750

[45] Date of Patent: Apr. 11, 1989

[54] PIGMENTED VINYL CHLORIDE POLYMER OR BLEND THEREOF HAVING IMPROVED MECHANICAL PROPERTIES

[75] Inventors: Marvin H. Lehr, Akron; John V. Standish, Cleveland, both of Ohio

[73] Assignee: The B.F. Goodrich Company, Akron, Ohio

[21] Appl. No.: 154,828

[22] Filed: Feb. 11, 1988

[51] Int. Cl.$^4$ ............................................. G08K 9/06
[52] U.S. Cl. .................................... 523/213; 524/413; 524/565
[58] Field of Search ................ 523/213, 214; 524/567, 524/413

[56] References Cited

U.S. PATENT DOCUMENTS 4,536,360 8/1985 Rahrig .
4,722,816 2/1988 Susumu et al. ........................ 264/22

OTHER PUBLICATIONS

Derwent, ABS 86-065443/10 Dainichiseika Color Chem., Jan. 24, 1986, J61016947.

Primary Examiner—Herbert J. Lilling
Attorney, Agent, or Firm—James R. Lindsay; Daniel J. Hudak

[57] ABSTRACT

The cohesion, creep resistance and yield strength of pigmented chlorinated polyvinyl chloride resin, polyvinyl chloride resin, or blends thereof is improved by coating the pigment with an amino silane coupling agent prior to blending the resin and the pigment.

19 Claims, No Drawings

PIGMENTED VINYL CHLORIDE POLYMER OR BLEND THEREOF HAVING IMPROVED MECHANICAL PROPERTIES

FIELD OF THE INVENTION

The present invention relates to pigmented chlorinated polyvinyl chloride, polyvinyl chloride, and blends thereof having improved cohesion, creep resistance, and yield strength.

BACKGROUND ART

Heretofore, chlorinated polyvinyl chloride (CPVC), due to its good chemical resistance and high heat distortion temperature, has been used for hot water pipes, pumps, and other applications where such properties are desired. Polyvinyl chloride (PVC) has also been utilized in pipes, pumps, and the like. Generally, CPVC compositions as well as PVC compositions are pigmented or contain inorganic fillers to improve processing or reduced cost. Unfortunately, these pigments can cause deterioration of mechanical properties such as creep resistance because of poor adhesion between the filler and the CPVC or PVC. In pipe applications, this deterioration of strength properties is undesirable.

U.S. Pat. No. 4,536,360 to Rahrig relates to polyvinyl chloride resins containing fiberglass sized with an amino silane coupling agent and an alkylene-oxide containing film former.

SUMMARY OF THE INVENTION

It is therefore an aspect of the present invention to provide a pigmented chlorinated polyvinyl chloride, a pigmented polyvinyl chloride, or blends thereof having improved durability. The durability is significantly improved as a result of improved CPVC or PVC adhesion with pigments. Adhesion, that is the ability of the matrix polymer to adhere to pigment under stress, is improved when the pigment is coated with a suitable coupling agent, such as an amino silane. The addition of the amino silane coupling agents further results in improved yield stress and creep properties.

DETAILED DESCRIPTION OF THE INVENTION

The chlorinated polyvinyl chloride (CPVC) resins of the present invention are generally in the form of a powder and contain from about 57 or 58 to about 72 percent by weight, and preferably from about 62 to about 72 percent by weight of chlorine therein based upon the total weight of the polymer. The preparation of CPVC is well known to the art and to the literature. CPVC compounds inherently have high melt viscosities and are difficult to process and fuse, and thus can have poor mechanical compatibility if the CPVC polymer does not adhere well to various compound ingredients such as pigments. The polyvinyl chloride (PVC) resins of the present invention can generally be any conventional resin as well as those known to the art and to the literature. Moreover, they can generally be made according to any conventional polymerization process such as suspension, emulsion, mass, and the like. Hereinafter, whenever the term "resin" is utilized, it means a CPVC polymer, a PVC polymer, or blends thereof.

Physical blends of CPVC with PVC can be utilized. Although the amount of PVC utilized with CPVC can range from about 0.1 percent to about 99 percent by weight of the CPVC and the PVC resin, generally the amount of PVC is limited to about 30 percent by weight. When amounts of PVC are utilized in excess of 30 percent by weight, favorable properties of CPVC such as high heat distortion, etc., are generally lost. Accordingly, an amount of PVC of from about 5 to about 30 percent by weight and preferably from about 10 to about 25 percent by weight based upon the total weight of the CPVC and PVC is utilized. Included within the definition of PVC are various copolymers thereof. The copolymer is made by polymerizing vinyl chloride monomers and a vinyl component monomer generally known to the art and to the literature. Examples of various component comonomers include vinyl acetate, methyl acrylate, methyl methacrylate, acrylonitrile, styrene, alpha methylstyrene, vinylidene chloride, and alkene comonomers having from 2 to 5 carbon atoms, with alkene comonomers having from 3 or 4 carbon atoms being preferred. The amount of the comonomer is generally from about 1 to about 15 percent and desirably from about 2 to about 8 percent by weight based upon the total weight of the PVC copolymer. However, PVC homopolymer is preferred.

The use of various pigments with the polymer resin is limited since pigments that are very basic (i.e. high pH) or very acidic tend to degrade the resin. By degradation, it is meant dehydrochlorination to the extent that the polymer resin or the composition has discolored. Hence, pigments are utilized which are relatively neutral in that they do not discolor the polymer. The relatively neutral pH range will vary from pigment to pigment but generally is from about 5 to about 9. Examples of suitable pigments include metallic oxides, such as various silicates, for example calcium silicate, mica, wollastonite, with titanium dioxide being preferred. The amount of the various pigments such as the metallic oxides is generally from about 2 to about 15 parts by weight and preferably from about 3 to about 7 parts by weight based upon 100 parts by weight of the resin, that is CPVC, PVC, or blends thereof.

According to the concepts of the present invention, it has been found that internal cohesion and related properties of pigmented resin are improved by treating the pigments with an amino silane coupling agent. It is highly desirable that the amino silane coupling agent coat the pigment. The amount of the amino silane coupling agent is an effective amount to improve cohesive properties of the resin, that is the CPVC, the PVC, or blends thereof. Such effective amounts are generally from about 0.1 to about 20 parts by weight, desirably from about 0.1 to about 10 parts by weight, and preferably from about 1 to about 5 parts by weight per 100 parts by weight of pigment. Pigments which tend to have high surface area such as the various silicates generally require amounts of the amino silane coupling agent within the upper portion of the abovenoted ranges.

The coupling agents can be represented by the following formula:

$$H_2N(CH_2)_x[NH(CH_2)_y]_zSi(OR)_3 \qquad \text{(FORMULA I)}$$

where x is 2 to 5, where y is 2 to 5, where z is 0 to 3 and desirably 1, 2 or 3, and where R is an alkyl having from 1 to 6 carbon atoms.

Amino silane coupling agents having the foregoing formula (I) are commercially available. Some of the amino silanes which are effective in producing the improved resins of the present invention are as follows:
beta-aminomethyltrimethoxysilane
N-beta-aminoethyl-gamma-aminopropyltrimethoxysilane
N-beta-aminoethyl-gamma-aminopropyltriethoxysilane
gamma-aminopropyltrimethoxysilane
gamma-methylaminopropyltrimethoxysilane
gamma-ethylaminopropyltrimethoxysilane
gamma-aminopropyltriethoxysilane
gamma-aminopropyltripropoxysilane
gamma-aminopropylmethyldiethoxysilane
gamma-aminopropylethyldiethoxysilane
gamma-aminopropylphenyldiethoxysilane
gamma-aminoisobutyltrimethoxysilane
N-(2-aminoethyl)-N'-[3-(triethoxysilyl)propyl]1,2-ethanediamine
N-(2-aminoethyl)-N'-[3-(trimethoxysilyl)propyl]1,2-ethanediamine
delta-aminobutyltriethoxysilane
delta-aminobutylmethyldiethoxysilane, and
beta-aminoethyltriethoxysilane.
Although the difunctional amino silane compounds set forth above are generally desired with N-beta-aminoethyl-gamma-aminopropyltrimethoxysilane being preferred, gamma-aminopropyltrimethoxysilane, a monofunctional silane, is also highly desirable.

The silane compounds are conveniently added in slurry form, i.e., with a volatile carrier, to the pigment. The carrier is subsequently evaporated whereby the silane compound coats the pigment. Examples of suitable carriers include water and alcohols containing from 1 to 5 carbon atoms, such as methanol and ethanol. Further details of applying the amino silane coupling agents to the pigment are set forth in U.S. Pat. No. 4,141,751 which is hereby fully incorporated by reference. However, it should be understood that other suitable methods can be utilized to apply the amino silane compound to the pigment.

The pigmented resins of the present invention are prepared by mixing the powdered ingredients comprising the amino silane coated pigment, the CPVC resin, the PVC resin, or blends thereof in a suitable mixer, such as a Henshel mixer. Suitable blending temperatures are from about room temperature to about 70° C. Various conventional compounding ingredients in conventional amounts can be added to the overall composition, such as processing aids, impact modifiers, lubricants, and stabilizers, as known to the art and to the literature. The overall composition blend is processed at a temperature above the glass transition temperature of the CPVC or PVC blend thereof with such temperatures being from about 160° to about 250° C. Processing is generally carried out under shear conditions as in a Banbury, a twin screw extruder, a two roll mill or the like. The compounded blend of the present invention can be used for various applications such as injection molding, extrusion molding, and the like. A particular end use is piping.

The pigmented resin compositions of the present invention result in significant increase in the internal cohesion as measured by yield strength and creep resistance. While the numerical differences shown in the tables below appear small, they represent changes on a logarithmic scale so that even small differences represent significant increased resistance to deformation under load.

It is generally thought that the amino silane coupling agents act by bonding (coupling) the resin with the pigment to increase adhesion between the resin and the pigment thereby providing increased cohesion of the compounded resin. Thus, the coupling agent serves to stop micromechanical failure by reducing the number of defects, such as voids at the resin/pigment interface. Under stress these defects multiply and coalesce to cause premature rupture. Since this failure generally occurs over a long period of time, a small decrease in properties such as creep amounts to a large increase in the amount of time to effect such a failure.

The present invention will be better understood by reference to the following examples.

EXAMPLES

The followng recipe was utilized in preparing Examples I through III:

CPVC (67% Cl) (i.e. TempRite 627×563) Mfg. by BFGoodrich: 100 grams
Thermolite 31, an organotin stabilizer Mfg. by M & T: 2.0 grams
PE Allied's AC629A, a lubricant Mfg. by Allied Chemical: 1 part Example I had no additional ingredients. Example II included 5.0 g of titanium dioxide pigment (Tipure R-960 by Dupont). Example III included 5.0 g of Tipure R-960 coated with an amino silane coupling agent (Z-620 manufactured by Dow Chemical Company, N-beta-aminoethyl-gamma-aminopropyltrimethoxysilane). The amount of the amino silane coupling agent was 1.5 parts by weight per 100 parts by weight of the titanium dioxide pigment. Yield stress properties at a pull rate of 0.2 in/min were taken for each sample and are set forth in Table I. The values represent an average of six specimens.

TABLE II

| EXAMPLE | YIELD STRESS (psi) |
|---------|--------------------|
| I       | 10,110 ± 370       |
| II      | 9,790 ± 120        |
| III     | 10,090 ± 125       |

As apparent from the above properties, approximately a 3% yield stress reduction was effected by the addition of a pigment, that is, Example II. However, upon the addition of an amino silane coupling agent of the present invention, Example III, the yield stress was restored to that of the untreated pigment compound.

Treating the pigment with the amino silane coupling agent was found to have a significant effect on reducing the creep properties of the compositions. The followng results were obtained using oval racetrack samples, annealed four hours at 110° C. and allowed to stand overnight at room temperature before running the creep test. The load was 800 psi. Averages of three samples are reported in Table II.

TABLE II

| Creep at 90° C., 800 psi Readings taken after 7291 minutes. | | |
|---|---|---|
| | Total % Elongation at 1.0 min. | Total % Elongation at 7040 min. |
| Example I | 0.74 ± 0.01 | 1.5 ± 0.10 |
| Example II | 0.90 ± 0.01 | 4.9 ± 0.07 |
| Example III | 0.78 ± 0.04 | 3.15 ± 0.02* |

*After 7291 minutes

As apparent from the above examples, the addition of a pigment, Example II, increased the elongation. However, upon the addition of an amino silane coupling agent, Example III, the elongation was significantly reduced.

These tests thus show significant improvement in dimensional stability and creep resistance in silane treated pigmented CPVC in accordance with the present invention.

While in accordance with the Patent Statutes, the best mode and preferred embodiment have been set forth, the scope of the invention is not limited thereto, but rather by the scope of the attached claims.

What is claimed is:

1. A pigmented polymer resin composition of improved cohesion properties, comprising:
    a polymer resin, said polymer resin being a chlorinated polyvinyl chloride resin having from about 58 to about 72 percent by weight of chlorine, or a blend of a chlorinated polyvinyl chloride resin containing up to about 30 percent by weight of a polyvinyl chloride resin, and
    a pigment which does not cause discoloration of said resin, said pigment coated with an effective amount of an amino silane so that said polymer has improved creep resistance, wherein said amino silane is represented by the formula

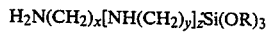 (FORMULA I), where x is 2 to 5, where y is 2 to 5, where z is 0 to 3, and R is an alkyl having from 1 to 6 carbon atoms, and wherein said amino silane is bonded to said polymer resin.

2. A chlorinated polyvinyl chloride composition as set forth in claim 1, wherein said pigment is a metallic oxide, and wherein the amount of said pigment is from about 2 to about 15 parts by weight per 100 parts by weight of said polymer resin.

3. A chlorinated polyvinyl chloride composition as set forth in claim 2, wherein said effective amount of said amino silane coupling agent is from about 0.1 to about 20 parts by weight per 100 parts by weight of said pigment.

4. A chlorinated polyvinyl chloride composition as set forth in claim 3, wherein said amino silane is selected from the group consisting of betaaminomethyltrimethoxysilane, gamma-aminopropyltrimethoxysilane, gamma-methylaminopropyltrimethoxysilane, gamma-ethylaminopropyltrimethoxysilane, gamma-aminopropyltriethoxysilane, gamma-aminopropyltripropoxysilane, gamma-aminopropylmethyldiethoxysilane, gamma-aminopropylethyldiethoxysilane, gamma-aminopropylphenyldiethoxysilane, gamma-aminoisobutyltrimethoxysilane, N-beta-aminoethyl-gamma-aminopropyltrimethoxysilane, N-beta-aminoethyl-gamma-aminopropyltriethoxysilane, N-(2-aminoethyl)-N'-[3-(triethoxysilyl)propyl]1,2-ethanediamine, N-(2-aminoethyl)-N'-[3-(trimethoxysilyl)propyl]1,2-ethanediamine, delta-aminobutyltriethoxysilane, delta-aminobutylmethyldiethoxysilane, and beta-aminoethyltriethoxysilane.

5. A chlorinated polyvinyl chloride composition as set forth in claim 4, wherein the amount of said amino silane is present in an amount of from about 0.1 parts to about 10 parts by weight per 100 parts by weight of said pigment, wherein the amount of chlorine in said chlorinated polyvinyl chloride is from about 62 percent to about 72 percent by weight, wherein the amount of said pigment is from about 3 to about 7 parts by weight per 100 parts by weight of said polymer resin, and wherein said amino silane coupling agent is N-beta-aminoethyl-gamma-aminopropyltrimethoxysilane, and gamma-aminopropyltrimethoxysilane.

6. A chlorinated polyvinyl chloride composition as set forth in claim 3, wherein said pigment is titanium dioxide.

7. A chlorinated polyvinyl chloride composition as set forth in claim 5, wherein said pigment is titanium dioxide.

8. A chlorinated polyvinyl chloride composition as set forth in claim 1, wherein said polyvinyl chloride resin is a copolymer made from vinyl chloride monomers and up to 15 percent by weight of a vinyl component comonomer.

9. A chlorinated polyvinyl chloride composition as set forth in claim 5, wherein said polyvinyl chloride resin is a copolymer made from vinyl chloride monomers and up to 8 percent by weight of a vinyl component comonomer, and wherein said vinyl component comonomer is alpha methylstyrene, vinylidene chloride, an alkene monomer having from 2 to 5 carbon atoms, vinyl acetate, methyl acrylate, methyl methacrylate, acrylonitrile, styrene, and combinations thereof.

10. A pigmented resin composition, consisting essentially of:
    a polymer resin, said polymer resin being a chlorinated polyvinyl chloride resin having from about 58 to about 72 percent by weight of chlorine, or a blend of a chlorinated polyvinyl chloride resin containing up to about 30 percent by weight of a polyvinyl chloride resin,
    a resin degrading free pigment containing from about 0.1 parts by weight to about 20 parts by weight of an aminosilane coupling agent per 100 parts by weight of said pigment, said amino silane coupling agent bonding said resin with said pigment so that said polymer resin has improved creep resistance, the amount of said pigment being from about 2 parts by weight to about 15 parts by weight per 100 parts by weight of said polymer resin, and
    an organotin stabilizer.

11. A pigmented composition as set forth in claim 10, wherein said pigment is a metallic oxide, and wherein said amino silane is represented by the formula

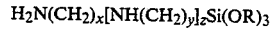 (FORMULA I)

wherein x is 2 to 5, wherein y is 2 to 5, wherein z is from 0 to 3, and wherein R is an alkyl having from 1 to 6 carbon atoms, and
    wherein said chlorinated polyvinyl chloride blend contains up to about 30 percent by weight of said polyvinyl chloride resin.

12. A pigmented composition as set forth in claim 11, wherein said amino silane is selected from the group consisting of betaaminomethyltrimethoxysilane, gamma-aminopropyltrimethoxysilane, gamma-methylaminopropyltrimethoxysilane, gamma-ethylaminopropyltrimethoxysilane, gamma-aminopropyltriethoxysilane, gamma-aminopropyltripropoxysilane, gamma-aminopropylmethyldiethoxysilane, gamma-aminopropylethyldiethoxysilane, gamma-aminopropylphenyldiethoxysilane, gamma-aminoisobutyltrimethoxysilane, N-beta-aminoethylgamma-aminopropyltrimethoxysilane, N-beta-aminoethyl-gamma-aminopropyltriethoxysilane, N-(2-aminoethyl)-N′-[3-(triethoxysilyl)propyl]1,2-ethanediamine, N-(2-aminoethyl)-N′-[3-(trimethoxysilyl)propyl]1,2-ethanediamine, delta-aminobutyltriethoxysilane, delta-aminobutylmethyldiethoxysilane, and beta-aminoethyltriethoxysilane.

13. A pigmented composition according to claim 12, wherein said chlorinated polyvinyl chloride blend contains from about 10 to about 25 percent by weight of said polyvinyl chloride resin, and wherein said resin free degrading pigment has a pH of from about 5 to about 9.

14. A pigmented composition according to claim 13, wherein the amount of chlorine in said chlorinated polyvinyl chloride resin is from about 62 percent to about 72 percent by weight, wherein said pigment is titanium dioxide, and wherein the amount of said pigment is from about 3 parts by weight to about 7 parts by weight per 100 parts by weight of said polymer resin, and wherein the amount of said amino silane coupling agent is from about 1.0 parts to about 5 parts by weight per 100 parts by weight of said pigment.

15. A pigmented composition according to claim 14, wherein said amino silane coupling agent is N-beta-aminoethyl-gamma-aminopropyltrimethoxysilane, and gamma-aminopropyltrimethoxysilane.

16. A pigmented composition according to claim 10, wherein said polyvinyl chloride resin is a copolymer made from vinyl chloride monomers and up to 15 percent by weight of a vinyl component comonomer.

17. A pigmented composition according to claim 13, wherein said polyvinyl chloride resin is a copolymer made from vinyl chloride monomers and up to 8 percent by weight of a vinyl component comonomer, and wherein said vinyl component comonomer is alpha methylstyrene, vinylidene chloride, an alkene monomer having from 2 to 5 carbon atoms, vinyl acetate, methyl acrylate, methyl methacrylate, acrylonitrile, styrene, and combinations thereof.

18. A shaped article comprising the composition of claim 10.

19. A shaped article comprising the composition of claim 14.

* * * * *